United States Patent
Lundholm

(10) Patent No.: US 10,237,312 B2
(45) Date of Patent: *Mar. 19, 2019

(54) METHOD AND DEVICE WITH INTELLIGENT MEDIA MANAGEMENT

(71) Applicant: Google Technology Holdings LLC, Mountain View, CA (US)

(72) Inventor: Andrew S. Lundholm, Hoffman Estates, IL (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/882,752

(22) Filed: Jan. 29, 2018

(65) Prior Publication Data

US 2018/0167429 A1  Jun. 14, 2018

Related U.S. Application Data

(63) Continuation of application No. 15/419,361, filed on Jan. 30, 2017, now Pat. No. 9,882,947, which is a
(Continued)

(51) Int. Cl.
*H04L 29/06* (2006.01)
*H04N 21/432* (2011.01)
(Continued)

(52) U.S. Cl.
CPC .......... *H04L 65/4069* (2013.01); *H04L 65/00* (2013.01); *H04L 65/4084* (2013.01);
(Continued)

(58) Field of Classification Search
None
See application file for complete search history.

(56) References Cited

U.S. PATENT DOCUMENTS

| 5,016,113 A | 5/1991 | Yamashita et al. |
| 6,574,594 B2 | 6/2003 | Pitman et al. |
| (Continued) | | |

FOREIGN PATENT DOCUMENTS

| EP | 2293301 | 11/2009 |
| WO | WO/2002/067537 | 8/2002 |
| (Continued) | | |

OTHER PUBLICATIONS

International Preliminary Report on Patentability dated Jun. 17, 2014 in International Patent Application No. PCT/US2012/067826.
(Continued)

*Primary Examiner* — Angela Nguyen
(74) *Attorney, Agent, or Firm* — Byrne Poh LLP

(57) ABSTRACT

A method (300) and device (200) with intelligent media management is disclosed. The method (300) can include: streaming (310) media content in a wireless communication device; identifying (320) a media signature of the streamed media content; searching (330) a stored library for the identified media signature; and playing (340) locally stored media content, if the search results in finding a match with the identified media signature in the stored library. Thus, when a match occurs, locally stored media content replaces the streamed media content, to provide substantially lower power consumption and enhanced battery life in connection with wireless communication devices.

21 Claims, 2 Drawing Sheets

Related U.S. Application Data continuation of application No. 15/081,375, filed on Mar. 25, 2016, now Pat. No. 9,560,101, which is a continuation of application No. 13/327,257, filed on Dec. 15, 2011, now Pat. No. 9,326,038.

(51) Int. Cl.
| | |
|---|---|
| *H04N 21/439* | (2011.01) |
| *H04N 21/61* | (2011.01) |
| *H04N 21/8352* | (2011.01) |
| *H04L 29/08* | (2006.01) |

(52) U.S. Cl.
CPC .......... *H04L 65/80* (2013.01); *H04L 67/2857* (2013.01); *H04N 21/4325* (2013.01); *H04N 21/4394* (2013.01); *H04N 21/6131* (2013.01); *H04N 21/8352* (2013.01)

(56) References Cited

U.S. PATENT DOCUMENTS

| | | | |
|---|---|---|---|
| 6,941,275 | B1 | 9/2005 | Swierczek |
| 7,675,514 | B2 | 3/2010 | Ni et al. |
| 8,937,648 | B2 | 1/2015 | Yang et al. |
| 2002/0040475 | A1 | 4/2002 | Yap et al. |
| 2002/0157034 | A1 | 10/2002 | Sagar |
| 2003/0093260 | A1 | 5/2003 | Dagtas et al. |
| 2008/0002650 | A1 | 1/2008 | Xia et al. |
| 2008/0066103 | A1 | 3/2008 | Ellis et al. |
| 2008/0239159 | A1 | 10/2008 | Read et al. |
| 2010/0057928 | A1 | 3/2010 | Kapoor et al. |
| 2010/0268360 | A1 | 10/2010 | Ingrassia et al. |
| 2012/0020647 | A1 | 1/2012 | Vogel |
| 2013/0147912 | A1 | 6/2013 | Kim et al. |

FOREIGN PATENT DOCUMENTS

| | | |
|---|---|---|
| WO | WO/2004/004351 | 1/2004 |
| WO | WO/2005/079499 | 1/2005 |
| WO | WO/2005/083559 | 9/2005 |

OTHER PUBLICATIONS

International Search Report and Written Opinion of the International Searching Authority dated Mar. 7, 2013 in International Patent Application No. PCT/US2012/067826.
Notice of Allowance dated Sep. 27, 2017 in U.S. Appl. No. 15/419,361.
Notice of Allowance dated Sep. 22, 2016 in U.S. Appl. No. 15/081,375.
Notice of Allowance dated Dec. 24, 2015 in U.S. Appl. No. 13/327,257.
Office Action dated May 27, 2015 in U.S. Appl. No. 13/327,257.
Office Action dated Jul. 11, 2017 in U.S. Appl. No. 15/419,361.
Office Action dated Sep. 25, 2014 in U.S. Appl. No. 13/327,257.
Office Action dated Oct. 6, 2017 in U.S. Appl. No. 15/056,336.
Shazam, "Shazam: Identify Songs for Android", pp. 1-4, available at: http:/www.best-choice-tech.com/software/shazam-identify-songs-for android.html, last accessed Mar. 1, 2011.
Wikipedia, "Acoustic Fingerprint", pp. 1-3, available at: http:/en.wikipedia.org/wiki/Acoustic_fingerprint, last accessed Mar. 1, 2011.
Office Action dated May 4, 2015 in U.S. Appl. No. 15/081,375.
Office Action dated Nov. 15, 2013 U.S. Appl. No. 13/327,257.

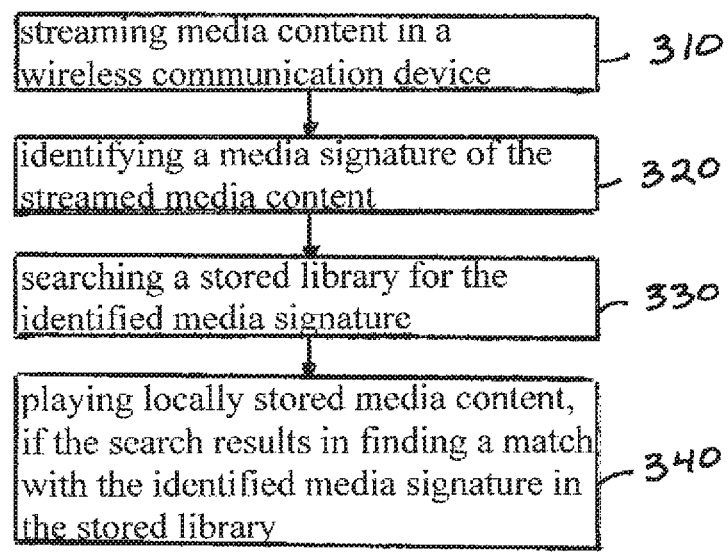
Fig. 3    300

METHOD AND DEVICE WITH INTELLIGENT MEDIA MANAGEMENT

CROSS-REFERENCE TO RELATED APPLICATIONS

This application is a continuation of U.S. patent application Ser. No. 15/419,361, filed Jan. 30, 2017, which is a continuation of U.S. patent application Ser. No. 15/081,375, filed Mar. 25, 2016, which is a continuation of U.S. patent application Ser. No. 13/327,257, filed Dec. 15, 2011, each of which is hereby incorporated by reference herein in its entirety.

TECHNICAL FIELD

The present disclosure relates to a method and device with intelligent media management.

BACKGROUND

As background, many wireless communication devices, such as smart phones and tablets, can barely get through a day on a single charge with normal use. With high use, or if the user cannot charge a wireless communication device at the end of the day, then a user will be left with a dead battery, resulting in a non-operational wireless communication device.

Power drain of a wireless communication device can be excessive when streaming media content, such as online audio and video content.

Pandora is a popular software application (App), available on a number of different mobile device operating systems including Windows and Android. Within this application, a user is able to "stream" desired music content to their mobile wireless communication device, such as E-reader, cell phone, automobile player, tablet and MP3 and MP4 players.

Shazam is another popular software application, also available on a number of different operating system (OS) platforms. Upon execution, Shazam prompts a user to direct a device microphone towards a source of music content. After "listening" for a short period of time, the song is analyzed (via a "fingerprinting" process, as identified by Wikipedia) and identified. The name of the song and musician is then made available to the user.

It would be considered an improvement in the art, if a wireless communication device with intelligent media management, could help to minimize or reduce power drain when consuming media, and particularly streaming media content.

It would be considered an improvement in the art, if wireless communication devices such as cell phones, tablets, Ipads, Ipods, MP3 audio players and MP4 video players, could play locally stored media content, directly from its local memory, if available in local memory or local library, rather than stream media content from a media content provider.

This replacing of streaming media content with locally stored media content could provide an enhancement in minimizing power drain by virtue of eliminating the current drain associated with the file streaming activity.

There is a need for methods and devices with intelligent media management, to better manage media and power drain in a wireless communication device.

It would be considered an improvement in the art, if wireless communication method and devices with enhanced media management were developed.

Thus, a method and device with intelligent media management that addresses these needs, would be considered an improvement in the art.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which:

FIG. 3 is an exemplary block diagram of a wireless communication method with intelligent media management according to one embodiment.

DETAILED DESCRIPTION

Figure 1:
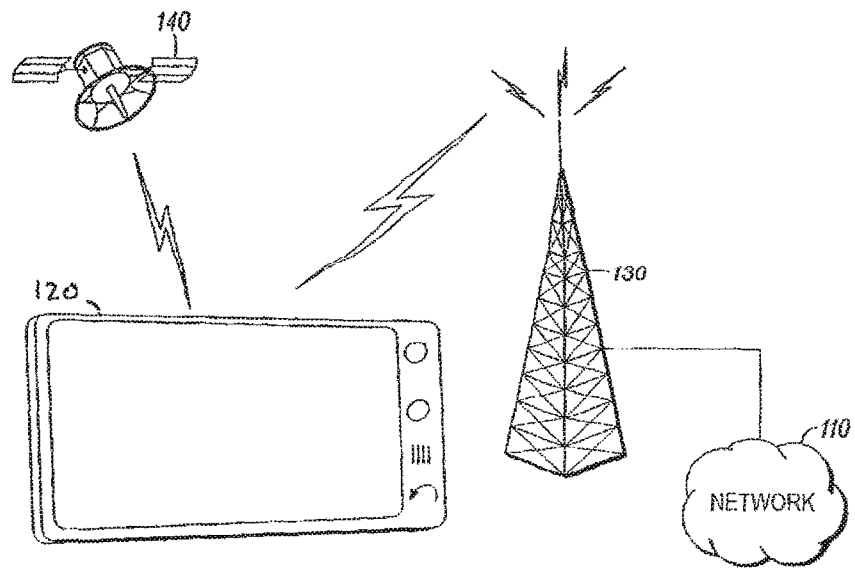
FIG. 1 is an exemplary block diagram of a communication system according to one embodiment.

FIG. 1 is an exemplary block diagram of a system 100 according to one embodiment. The system 100 can include a network 110, a terminal 120, and a base station 130. The terminal 120 may be a wireless communication device, such as a wireless telephone, a cellular telephone, a personal digital assistant, a pager, a personal computer, a tablet, a selective call receiver, or any other device that is capable of sending and receiving communication signals on a network including a wireless network. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, Global System for Mobile Communications (GSM), a Third Generation (3G) network, a Fourth Generation (4G) network, a satellite communications network, and other like communications systems. More generally, network 110 may include a Wide Area Network (WAN), a Local Area Network (LAN) and/or a Personal Area Network (PAN). Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminal 120 can communicate with the network 110 and with other devices on the network 110 by sending and receiving wireless signals via the base station 130, which may also comprise local area, and/or personal area access points. The terminal 120 is shown being in communication with a global positioning system (GPS) 140 satellite, global navigation satellite system (GNSS) or the like, for position sensing and determination.

Figure 2:
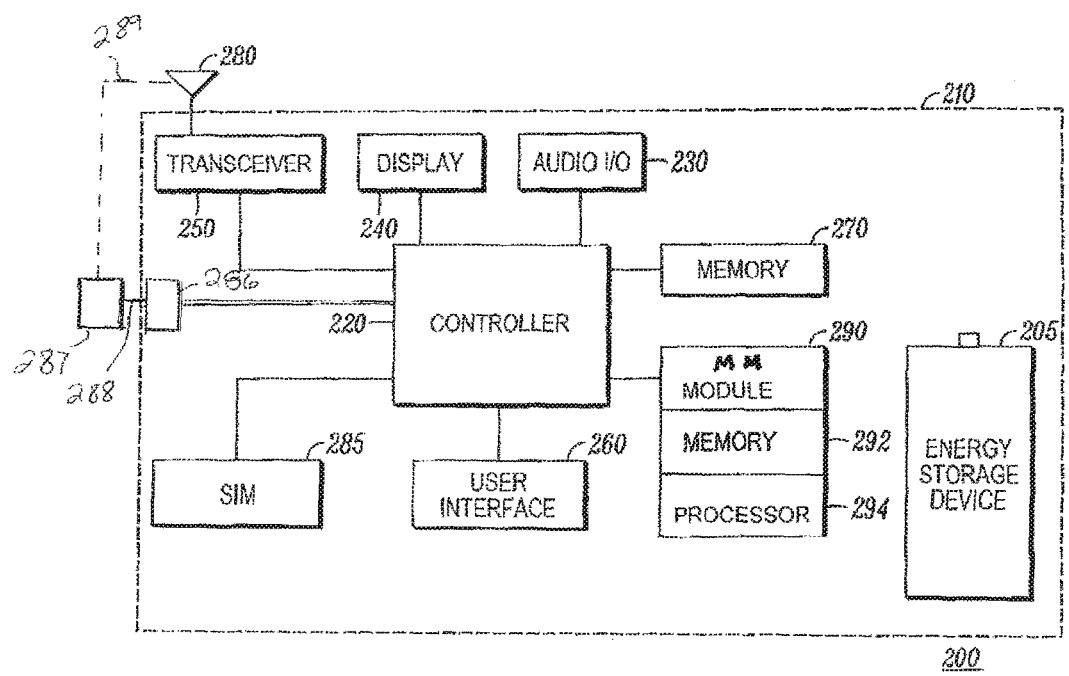
FIG. 2 is an exemplary block diagram of a wireless communication device with intelligent media management according to one embodiment.

FIG. 2 is an exemplary block diagram of a wireless communication device 200 configured with an energy storage device, battery or module 205, such as in the terminal 120, for example. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, an antenna 280 coupled to the housing 210 and the transceiver 250, and a removable subscriber module 285 coupled to the controller 220.

As shown in FIG. 2, the wireless communication device 200 further includes a media manager (MM) module 290 configured to: identify a media signature of the media content; search a locally stored library for the identified media signature; and play locally stored media content, if the search results in finding a match with the identified media signature in the locally stored library. The MM module 290 can include a memory 292 and a processor 294. Advantageously, the MM module 290 can help to improve management of media content and help to lower power drain, to actively manage media content and enhance battery life, as detailed herein.

In one embodiment, the MM module 290 can reside within in the controller 220, can reside within the memory 270, can be an autonomous module, can be software, can be hardware, or can be in any other format useful for a module on a wireless communication device 200. In one embodiment, the Media Manager software with Applicant's fingerprinting feature, may even reside on a network, such as network 110. It is not required for it to reside within the mobile communication device.

The display 240 can be a liquid crystal display (LCD), a light emitting diode (LED) display, a plasma display, a touch screen display or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch screen or pad, a joystick, an additional display, or any other device useful for providing an interface between a user and an electronic device. The memory 270 may include a random access memory, a read only memory, an optical memory or any other memory that can be coupled to a wireless communication device.

In more detail, the wireless communication device 200 shown in FIG. 2, can include: a housing 210; a controller 220 coupled to the housing 210, the controller 220 configured to control the operations of the wireless communication device, and to provide ancillary computing operations which may be unrelated to wireless communications such as audio or video processing, application processing, etc.

Turning to FIG. 3, a block diagram of a wireless communication method with intelligent media management 300, is shown. In its simplest form, the method 300 can include: streaming 310 media content in a wireless communication device; identifying 320 a media signature of the streamed media content; searching 330 a stored library for the identified media signature; and playing 340 locally stored media content, if the search results in finding a match with the identified media signature in the stored library.

Advantageously, when a match occurs, which may be defined as the search results in finding the identified media signature in the stored library, preferably a locally stored library, the method 300 proceeds to play 340 locally stored media content (or replacement media content), instead of the streamed media content. Stated another way, when a match occurs the streamed media content is replaced with locally stored media. This can provide lower power consumption and enhance useful battery life in a wireless communication device.

For example, a sample Motorola Bravo phone streaming audio content was measured under normal conditions to consume about 97.6 mA of current drain, while using an external headset connection. The same sample Motorola Bravo phone playing MP3 content consumed about 41.6 mA. Thus, as can be seen from this example, current drain of this Bravo cell phone is lower when playing an MP3 audio file, from a locally stored library, as compared to streaming the same content. Accordingly, playing locally stored media content instead of streamed media content can result in over a 55% reduction in current drain.

Advantageously, a method that can replace streamed media content with local media content, can dramatically increase the useful life of a rechargeable battery, thus delaying the need for a charge, which users will welcome.

As used herein, the term media signature, has its common ordinary meaning in the art. For example, a media signature generally includes receiving a source of streaming media content for a short period of time, analyzing it via a "fingerprinting" process, as detailed in Wikipedia, and identifying it.

Multiple methods are available for "fingerprinting." The description herein is a high-level simplistic overview solely for the purpose of providing a brief description. The audio and/or video content may be sampled in the time domain. These time samples are then compared to time samples previously stored within a master library. In the event that one of the time samples matches samples contained within the master library, then the time sample properties (song, composer, movie name, etc) could be inferred from the master library reference properties.

As used herein, the terminology "identifying a media signature" and "fingerprinting" of streamed media content, are used interchangeably and have substantially similar meanings.

In one embodiment, the method 300 can discontinue the streaming of media content while the locally stored media content or "replacement content" is played. This feature can help save power by only playing the locally stored media content, rather than playing the networked streamed version of the identical content requiring the enablement of the radio transceiver (250).

In one embodiment, the method 300 can provide a signal to a media content provider that the streaming media content is continuing to be received, while the locally stored media content is played. This feature allows a device to play the locally stored media content, and return to the streaming media content thereafter as if never leaving the stream without any interaction required from the user. For example, the signal can appear to be an acknowledgement to a media content provider, despite the fact that the device is actually playing the locally stored content and not actually playing the streaming media content at that moment. The device will likely return or default back to the streaming media content after the local media content has played.

Continuing, in a preferred embodiment, the method 300 can continue the streaming of media content after the locally stored media content has played. This feature allows a user, with his or her device, to continue to consume streaming media content in a seamless and uninterrupted way after the locally stored media content has played.

In connection with the searching step 330, it can include providing an indication that the search has successfully found a match of the identified media signature in the locally stored library. This feature can provide an indication to a user, such as on a display or user interface, that a match has been found, and power savings is possible, by playing locally stored media content found in the locally stored library. As should be understood, the indication to a user can be audio, haptic or visual, for example.

In one use case, the method 300 can include suspending the searching step 330 for a predetermined period. In this case, a user can disable the method when there is a low likelihood that an identified media signature will be found in the locally stored library. This suspending feature can provide savings in power drain by also eliminating the need for content fingerprinting since it is no longer necessary for normal media streaming. This feature allows a user to consume the streaming media content without interruption, if desired.

The suspension feature or step can be set or actuated in a number of ways, such as by programming a setting or profile, actuating a user interface, such as a key or touch screen and the like. For example, when a user is playing certain music or video, and he or she knows such content is not in the local library, he can suspend the operation, to save power.

In another embodiment, the method 300 can include providing an indicator that locally stored media content is being played. This feature can provide an indication to a user that locally stored media content is being played, thus providing lower power drain than when streaming.

The method 300 can include setting or programming a desired user interface experience. This feature allows a user to program a desired user experience, by for example down loading a pre-programmed or updated desired look and feel media experience. The program or application in the MM module 290 can include controlling and operating a user interface, a touch screen display or display and key board. This feature can provide personalized and reliable content management in connection with a wireless communication device, for example.

In connection with the identifying step 320, this step can include recognizing an identifier. For example, streaming media content can include an identifier, such as an identifier header, a title, author, composer and the like. When these properties are available as part of the streamed content, then it is not necessary to "fingerprint" as content recognition is not required. The provided properties can then be used to search a locally stored library.

In another embodiment, in connection with the identifying step 320, when the identified media signature of the streamed media content identifies an absence of streaming media content, the playing step can include playing substitute locally stored media content.

For example, when the identified media signature of the streamed media content includes an absence of streaming media content or a "dead air" condition, the playing step can play substitute (or replacement) locally stored media content for a certain time.

For example, in one use case, when driving down a rural road and listening to streaming music such as Pandora, a user can enter a dead zone. In this example, the method 300 can provide substitute locally stored media content, as programmed by a user. While continuing to drive, the user may subsequently enter a coverage area and the streaming media content could then resume as usual.

Also in connection with the identifying step 320, in another embodiment, when the media signature of the streamed media content is not recognized, the searching step 330 can be temporarily terminated and the playing step can include at least one of muting and playing substitute locally stored media content. For example, when the media signature of the streamed media content is not recognized or identified, the searching step 330 can be temporarily terminated and the playing step can include at least one of muting and playing substitute locally stored media content. When the streaming media content resumes, it can be played or if the search results in a match, locally stored media content can be played.

In another use case a user may be streaming content. Should the "fingerprinting" of the content result in a determination that that content is un-identified or undesired (as may be the case with commercial advertisements within the content), then the MM module could replace the undesired content with substitutive material. The user could replace this undesired content with alternative pre-determined content, other random content, or simply mute the undesired content entirely (replacing it with no content).

Turning to FIG. 2, the locally stored library can include at least one of memory in the wireless communication device, such as memory 270 and 292 and external locally stored library (memory) 287 linked to the wireless communication device 200. The link can be a direct wired connection 288 via a connector 286, or a wireless connection 289, shown by dashed line in FIG. 2, such as by use of near field communication, Bluetooth and the like.

For example, the locally stored library can include an external locally stored library 287 or external memory devices, such as memory stick, server and the like coupled to the wireless communication device 200 via connector 286.

Thus, in one embodiment, the stored library can include a locally stored library and/or a remote stored library. The remote stored library can include, for example, a connection to a remote server and/or connection to a network with memory.

In connection with streaming media content, such content can vary widely. For example, it can also include at least one of audio content, video content, digital content, broadcast content, amplitude modulated (AM) content, frequency modulated (FM) content, digital data, still video, pictures, text and portraits.

For example, in a case where a user is streaming media content provided via an AM radio link, this content may be degraded by noise, as typically associated with AM broadcast content. However, via the "fingerprinting" process and the MM module, as detailed herein, substitution with a locally stored replacement content can be played instead.

The fidelity or quality, of the degraded original broadcast is essentially replaced with a higher quality low-noise replacement of identical content. In this case the user not only appreciates the lower power drain that may be available, they also enjoy a high fidelity, higher quality replay of substantially equivalent content.

In another case, the streamed content may consist of multiple portions. For instance a portion of the content may be photographs (in a form such as JPEG files), while another portion may consist of textual content (consisting of text or other arbitrary content).

Should a portion of the overall streamed content be recognizable via the "fingerprinting" method, then benefits could be realized by replacing that recognizable content with locally stored content instead thereby realizing the same benefits as previously described.

Referring back to FIG. 2, a wireless communication device 200 with intelligent media management is shown. In one embodiment, the device 200 can include: a housing 210;

a controller 220 coupled to the housing 210, the controller 220 configured to control the operations of a wireless communication device; a transceiver 250 configured to receive wireless communication including media content; and a media manager module 290 configured to: identify a media signature of the media content; search a stored library for the identified media signature; and play locally stored media content, if the search results in finding a match with the identified media signature in the stored library. Advantageously, when a match occurs, locally stored media is played replacing the media content, such as streamed media content, to lower power consumption and resulting in extending useful battery life in a portable device.

In one embodiment, the media manager module 290 is configured to provide a signal to a media content provider that the streaming media content is continuing to be received, while the locally stored media content is actually being played. This feature allows a device to play the locally stored media content, and return to the streaming media content thereafter, as previously detailed.

In another embodiment, the media manager module 290 is configured to provide a desired user interface experience. This feature allows a user to program a desired user interface experience, as previously detailed.

In an alternate embodiment, when the media signature of the streamed media content is not recognized by the media manager module 290, the search step is temporarily terminated and the playing can include at least one of muting and playing substitute locally stored media content. For example, when the media signature of the streamed media content is not recognized or identified, the searching step can be temporarily terminated and the playing step can include at least one of muting and playing substitute locally stored media content. When the streaming media content resumes, by identifying the media signature of the streamed media content, the streaming media content can then resume being played and if the search results in finding the identified media signature in the locally stored library, locally stored media content can be played.

In one arrangement, the locally stored library includes at least one of memory in the wireless communication device 200, such as in memory 270 and 292 and memory linkable to the wireless communication device 200, such as external locally stored library 287, as shown in FIG. 2, for example. For example, the locally stored library can include memory of external devices, such as memory sticks, servers and the like coupled with the wireless communication device 200. The locally stored library can include a wired connection 288 with use of a connector 286, for example, and a wireless connection 289, to the wireless communication device 200.

The MM module 290 can include a program loadable and customizable by a user, by downloading a software program, adjusting a setting and inputting information in a profile, for example. Advantageously, a user can load an application through a USB connection, or download a program or update on the wireless communication device 200. Similarly, upgrades and customizations can be loaded in any customary way.

The MM module 290 can be programmed to automatically take immediate power reduction measures, by suspending operation or adjusting certain applications and functions, based on information programmed by a user or a profile set by a user, for example.

A user can be offered a pre-configured profile to allow selection of a profile that is close to a user's expectations of how the device should work, for enhancing streaming management and consumption of media content.

Advantageously, this method allows a user to actively, manually or automatically, and intelligently manage streaming media content and power drain of an energy storage device.

The device 200 and method 300 are preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims.

Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method for presenting media content, the method comprising:
   receiving, using a hardware processor of a wireless communication device, a plurality of media content items in a content stream from a media content provider;
   determining that a version of a media content item from the plurality of media content items is stored in a memory on the wireless communication device;
   in response to determining that the version of the media content item is stored in the memory, inhibiting reception of the content stream from the media content provider in the wireless communication device when the media content item is to be played back and transmitting a signal to the media content provider that the media content item is continuing to be received from the media content provider;
   causing the version of the media content item from the memory to be presented; and in response to determining that presentation of the media content item has ended, resuming reception of the content stream from the media content provider.

2. The method of claim 1, further comprising:
identifying a media signature of the media content item in the content stream from the media content provider; and
determining that the media signature of the media content item matches a search result in the memory of the wireless communication device.

3. The method of claim 1, further comprising presenting an indicator on a display associated with the wireless communication device that the version of the media content item being presented has been retrieved from the memory of the wireless communication device.

4. The method of claim 1, further comprising receiving one or more identifiers of the plurality of media content items in the content stream from the media content provider, wherein determining that the version of the media content item is stored in the memory of the wireless communication device comprises determining that an identifier associated with media content item stored in the memory of the wireless communication device matches at least one of the one or more identifiers of the plurality of media content items in the content stream from the media content provider.

5. The method of claim 1, further comprising:
receiving, from the wireless communication device, a selection to retrieve the media content item from the media content provider in lieu of the version of the media content item from the memory of the wireless communication device; and
continuing to present the content stream from the media content provider in response to receiving the selection.

6. The method of claim 3, further comprising, in response to resuming the reception of the content stream from the media content provider, modifying the indicator on the display associated with the wireless communication device.

7. The method of claim 5, further comprising transmitting a request for the media content item to a server associated with the media content provider and inhibiting the version of the media content item from being retrieved for presentation from the memory of the wireless communication device.

8. A system for presenting media content, the system comprising:
a memory; and
a hardware processor that, when executing computer-implemented instructions stored in the memory, is configured to:
receive a plurality of media content items in a content stream from a media content provider;
determine that a version of a media content item from the plurality of media content items is stored in the memory;
in response to determining that the version of the media content item is stored in the memory, inhibit reception of the content stream from the media content provider when the media content item is to be played back and transmitting a signal to the media content provider that the media content item is continuing to be received from the media content provider;
cause the version of the media content item from the memory to be presented; and
in response to determining that presentation of the media content item has ended, resume reception of the content stream from the media content provider.

9. The system of claim 8, wherein the hardware processor is further configured to:
identify a media signature of the media content item in the content stream from the media content provider; and
determine that the media signature of the media content item matches a search result in the memory.

10. The system of claim 8, wherein the hardware processor is further configured to present an indicator on a display that the version of the media content item being presented has been retrieved from the memory.

11. The system of claim 8, wherein the hardware processor is further configured to receive one or more identifiers of the plurality of media content items in the content stream from the media content provider, wherein determining that the version of the media content item is stored in the memory comprises determining that an identifier associated with media content item stored in the memory matches at least one of the one or more identifiers of the plurality of media content items in the content stream from the media content provider.

12. The system of claim 8, wherein the hardware processor is further configured to:
receive a selection to retrieve the media content item from the media content provider in lieu of the version of the media content item from the memory; and
continue to present the content stream from the media content provider in response to receiving the selection.

13. The system of claim 10, wherein the hardware processor is further configured to, in response to resuming the reception of the content stream from the media content provider, modify the indicator on the display.

14. The system of claim 12, wherein the hardware processor is further configured transmit a request for the media content item to a server associated with the media content provider and inhibiting the version of the media content item from being retrieved for presentation from the memory.

15. A non-transitory computer-readable medium comprising computer-executable instructions that, when executed by a processor, cause the processor to perform a method for presenting media content, the method comprising:
receiving a plurality of media content items in a content stream from a media content provider;
determining that a version of a media content item from the plurality of media content items is stored in a memory on a wireless communication device;
in response to determining that the version of the media content item is stored in the memory, inhibiting reception of the content stream from the media content provider in the wireless communication device when the media content item is to be played back and transmitting a signal to the media content provider that the media content item is continuing to be received from the media content provider;
causing the version of the media content item from the memory to be presented; and
in response to determining that presentation of the media content item has ended, resuming reception of the content stream from the media content provider.

16. The non-transitory computer-readable medium of claim 15, wherein the method further comprises:
identifying a media signature of the media content item in the content stream from the media content provider; and
determining that the media signature of the media content item matches a search result in the memory of the wireless communication device.

17. The non-transitory computer-readable medium of claim 15, wherein the method further comprises presenting an indicator on a display associated with the wireless communication device that the version of the media content item being presented has been retrieved from the memory of the wireless communication device.

18. The non-transitory computer-readable medium of claim 15, wherein the method further comprises receiving one or more identifiers of the plurality of media content items in the content stream from the media content provider, wherein determining that the version of the media content item is stored in the memory of the wireless communication device comprises determining that an identifier associated with media content item stored in the memory of the wireless communication device matches at least one of the one or more identifiers of the plurality of media content items in the content stream from the media content provider.

19. The non-transitory computer-readable medium of claim 15, wherein the method further comprises:

receiving, from the wireless communication device, a selection to retrieve the media content item from the media content provider in lieu of the version of the media content item from the memory of the wireless communication device; and continuing to present the content stream from the media content provider in response to receiving the selection.

20. The non-transitory computer-readable medium of claim 17, wherein the method further comprises, in response to resuming the reception of the content stream from the media content provider, modifying the indicator on the display associated with the wireless communication device.

21. The non-transitory computer-readable medium of claim 19, wherein the method further comprises transmitting a request for the media content item to a server associated with the media content provider and inhibiting the version of the media content item from being retrieved for presentation from the memory of the wireless communication device.

* * * * *